(12) United States Patent
Burton

(10) Patent No.: US 6,529,182 B1
(45) Date of Patent: Mar. 4, 2003

(54) EFFICIENT CONTROLLED CURRENT SINK FOR LED BACKLIGHT PANEL

(75) Inventor: Scott Richard Burton, Ottawa (CA)

(73) Assignee: Mitel Corporation, Kanata (CA)

( * ) Notice: Subject to any disclaimer, the term of this patent is extended or adjusted under 35 U.S.C. 154(b) by 183 days.

(21) Appl. No.: 09/697,538

(22) Filed: Oct. 26, 2000

(30) Foreign Application Priority Data

Oct. 26, 1999 (GB) .............................................. 9925263

(51) Int. Cl.[7] .................................................. G09G 3/36
(52) U.S. Cl. ........................................ 345/102; 345/82
(58) Field of Search ............................ 345/102, 87, 82, 345/94

(56) References Cited

U.S. PATENT DOCUMENTS 3,705,316 A 12/1972 Burrous et al. ............. 327/513

FOREIGN PATENT DOCUMENTS

GB 2087604 5/1982
JP 11068161 3/1999

OTHER PUBLICATIONS

U.K. Search Report [Feb. 29, 2000].

*Primary Examiner*—Steven Saras
*Assistant Examiner*—Uchendu O. Anyaso
(74) *Attorney, Agent, or Firm*—Jones, Day, Reavis & Pogue

(57) ABSTRACT

A circuit for controlling current flow though an LED backlight network, comprising a PWM circuit for receiving an input DC voltage (Vsource) and in response generating a chopped output voltage (Vsw), a filter for smoothing the output voltage (Vsw) resulting in a DC output voltage (Vout) for application to a first terminal of the LED backlight network. A resistance (Rcp) is connected between ground and a second terminal of the LED backlight network so as to create a node voltage (Vref) connected to a feedback input of the PWM circuit. In operation, the PWM circuit maintains a constant controlled current through the LED backlight network by regulating Vout in accordance with the node voltage (Vref).

2 Claims, 2 Drawing Sheets

EFFICIENT CONTROLLED CURRENT SINK FOR LED BACKLIGHT PANEL

FIELD OF THE INVENTION

This invention relates in general to LED control circuits, and more particularly to a circuit for efficiently controlling current through an LED backlight panel.

BACKGROUND OF THE INVENTION

Liquid Crystal Displays (LCDs) often incorporate backlight panels for to permit viewing in poor lighting conditions. The use of LEDs (Light Emitting Diodes) is known for the purpose of illuminating such LCD displays. Prior art LED backlight panels have used a plurality of parallel LED banks disposed behind the LCD display (e.g. four parallel banks of two series-connected LEDs per bank). In order to properly control the amount of illumination it is necessary to control the current passing through the LEDs. Since each of the LEDs is characterized by a voltage drop of from 2.0 V to 2.5 V, it is not possible to provide a controlled current supply from a standard 5 V supply voltage rail.

Thus, according to one prior art approach a linear voltage regulator has been configured to function as a current source for the LEDs (provided that there is sufficient voltage to drive the regulator). One disadvantage of this approach is that excessive power dissipation in the regulator results in high inefficiencies, particularly if the available voltage is unregulated and varies over a wide range. Furthermore, the regulator may be required to be fitted with a heat sink in order to limit the regulator temperature rise.

Another prior art approach overcomes the efficiency problems of the abovediscussed approach by doubling the standard regulated 5 V supply voltage though a charge pump (e.g. switched capacitor) or other voltage step-up circuit, in order to deliver approximately 9 V and using a low dropout voltage regulator configured as a current sink for controlling the LED current. The use of a regulated source voltage improves on efficiency relative to the first mentioned prior art approach, but considerable power must still be dissipated in the current sink circuit. This latter prior art approach is also costly and consumes valuable printed circuit board area.

SUMMARY OF THE INVENTION

According to the present invention, the LED backlight network is placed in the feedback path of an efficient switching power supply. The switching power supply directly controls the current through the LEDs and adjusts its output voltage as required to accommodate the forward voltage drop across the LEDs. Efficiency is much improved relative to the prior art since the power supply is able to provide the LEDs with only enough voltage to satisfy the current required for a desired brightness. A variation of the switching power supply circuit according to the invention further improves efficiency and limits the output voltage, but at the expense of an increase in LED current variation.

BRIEF DESCRIPTION OF THE DRAWINGS

A preferred embodiment of the present invention is described herein below with reference to the drawings in which.

DETAILED DESCRIPTION OF THE PREFERRED EMBODIMENT

Figure 1:
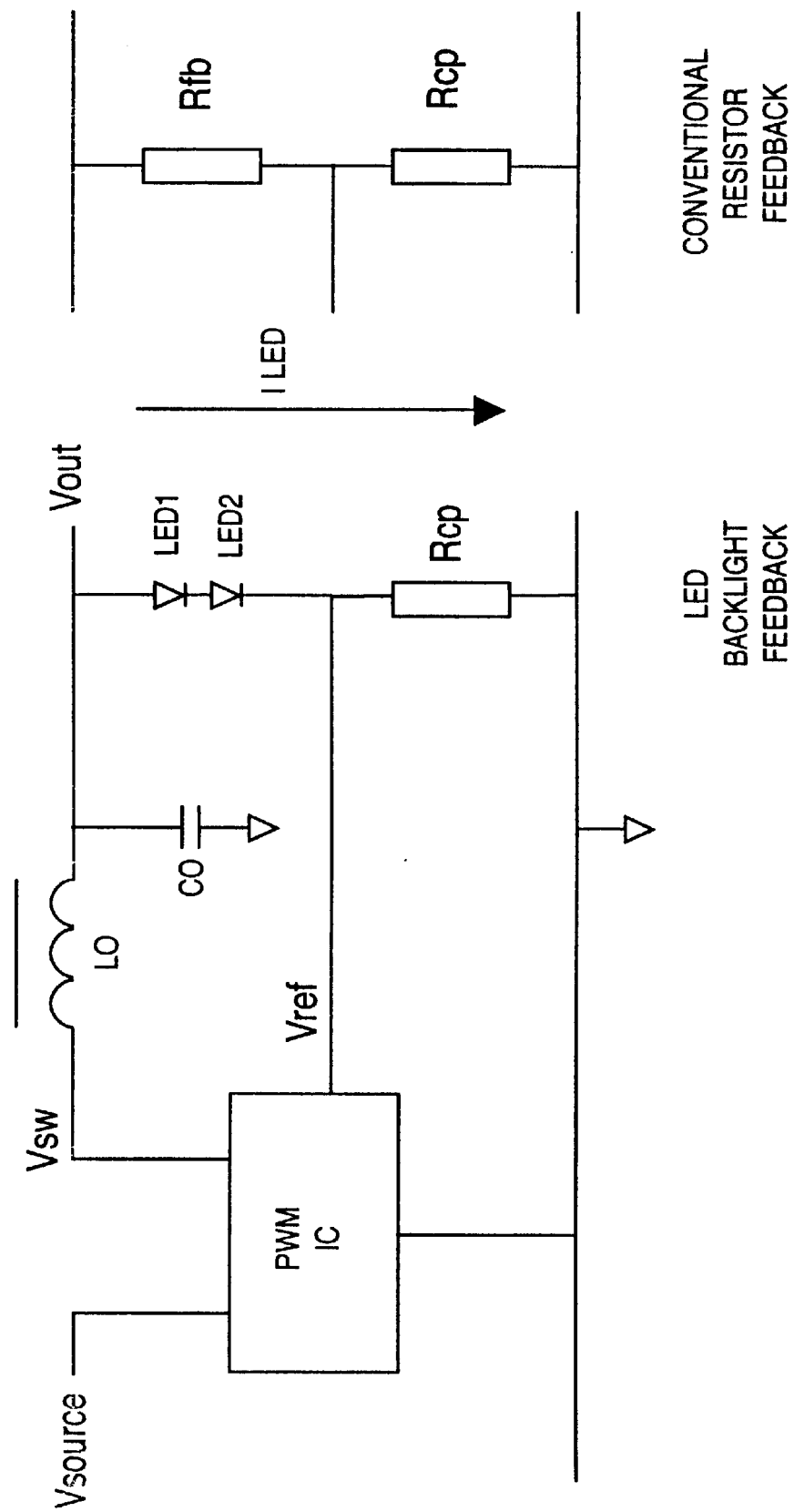
FIG. 1 is a schematic diagram of an LED current control circuit according to the preferred embodiment.

With reference to FIG. 1, a standard, voltage step-down, switching power supply circuit is shown comprising a PWM (Pulse Width Modulator) and an output filter. The circuit of FIG. 1 is commonly known in the art as a "buck regulator". The PWM chops the DC input voltage (Vsource) to produce a voltage Vsw. The voltage Vsw is filtered via Lo and Co to yield a DC voltage Vout. The PWM circuit regulates Vout to a constant value by modulating the duty cycle of the chopped waveform as required to maintain Vref equal to the internal reference voltage for the PWM circuit. Conventionally, a voltage divider comprising series connected resistors Rfb and Rcp, is used between Vout and ground. Vref appears at the node connecting Rfb and Rcp, for feedback to the PWM circuit. Thus, Vout is regulated at a fixed multiple ((Rcp+Rfb)/Rcp) of Vref.

According to the present invention, the resistor Rfb is replaced by the LED backlight network (i.e. by series connected LED1 and LED2). The current, ILED, through this network has a value equal to Vref/Rcp. The PWM circuit maintains ILED at a constant, controlled level by varying Vout as required to accommodate manufacturing variations in the forward voltage drops across the LEDs.

Figure 2:
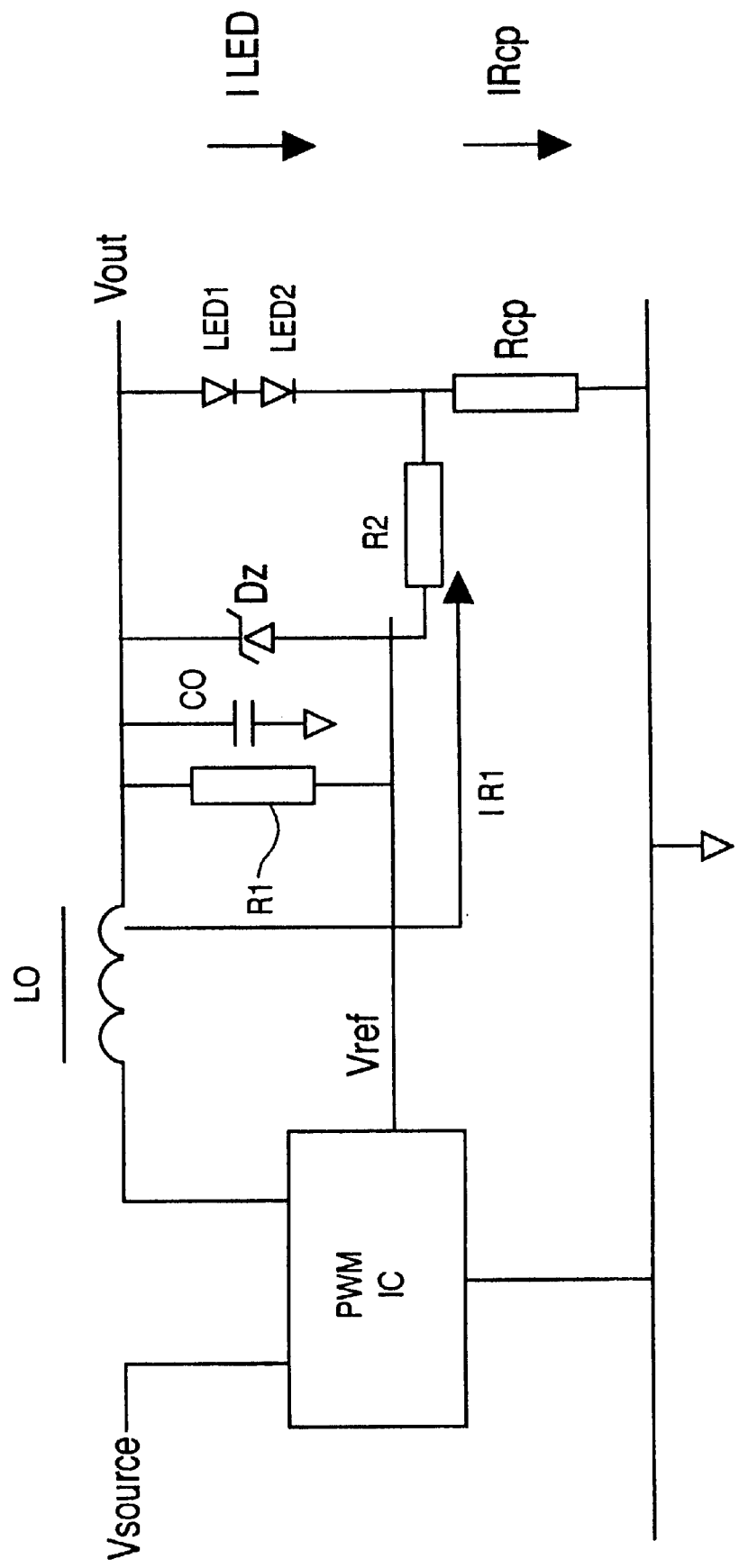
FIG. 2 is a schematic diagram of an alternative embodiment of the LED current control circuit according to the present invention.

With reference to FIG. 2, an alternative embodiment is shown wherein further efficiency improvements are realized as well as a simple design for limiting Vout in the event of accidental disconnection of the backlight network, thereby reducing the potential for damage to other electrical loads to which Vout may be connected.

In the circuit of FIG. 2, ILED no longer equals Vref/Rcp but is, instead, equal to (Vref(R1+R2+Rcp)−Vout(R2+Rcp))/R1Rcp. According to this relationship, ILED is somewhat dependent on Vout such that ILED decreases as Vout increases. Thus, ILED is not as tightly controlled as in the preferred embodiment of FIG. 1. However, there are two benefits which at least partially offset the foregoing disadvantage. Firstly, the voltage across Rcp is less than Vref, which results in a lower Vout for a given LED network voltage drop. Consequently, the power dissipation in Rcp is reduced, thereby making the circuit more efficient. Also, Vout is lower so that power dissipation may be reduced in any linear post-regulators that may also be supplied by Vout. Secondly, the circuit allows for the addition of low power Zener diode Dz for limiting the value of Vout in the event of accidental disconnection of the backlight LED network, as indicated above.

In summary, according to the present invention the output voltage of a switching power supply is controlled so as to provide a desired LED current (ILED). The use of an industry standard buck regulator provides greater efficiencies than linear regulators. The circuit of the present invention limits the voltage generated by the buck regulator to that required to generate current for a desired brightness of the LEDs. Efficiency is maximized by minimizing any excess voltage or current.

It will be appreciated that, although particular embodiments of the invention have been described and illustrated in detail, various changes and modifications may be made. For example, although the preferred embodiment utilizes a standard buck regulator to power the LED backlight network, any non-isolated or isolated switching power supply circuit topology may be used. All such changes and modifications may be made without departing from the sphere and scope of the invention as defined by the claims appended hereto.

What is claimed is:

1. A circuit for controlling current flow through an LED backlight network, comprising:

a switching power supply circuit for receiving an input voltage (Vsource) and in response generating an output voltage (Vout) for application to a first terminal of said LED backlight network; and a resistance (Rcp) connected between ground and a second terminal of said LED backlight network so as to create a node voltage (Vref) which is applied to a feedback input of said switching power supply circuit, whereby said switching power supply circuit maintains a constant controlled current through said LED backlight network by regulating said output voltage (Vout) in accordance with said node voltage (Vref);

wherein said switching power supply circuit is a buck regulator switching power supply comprising:

a PWM circuit for receiving said input voltage (Vsource) and in response generating a chopped output voltage (Vsw); and a filter for receiving said chopped output voltage (Vsw) and in response generating said output voltage (Vout), wherein said filter comprises an inductor having a first terminal connected to said PWM circuit and a second terminal connected to the first terminal of said LED backlight network, a first resistor R1 having a first terminal connected to the second terminal of said inductor and a second terminal connected to said feedback input of the PWM circuit, and a second resistor R2 having a first terminal connected to said feedback input of the PWM circuit and a second terminal connected to the second terminal of said LED backlight network.

2. The circuit of claim 1, further including a Zener diode Dz having a first terminal connected to the second terminal of said inductor and a second terminal connected to a node interconnecting the feedback input of said PWM circuit, the second terminal of said first resistor R1 and the first terminal of said second resistor R2.

* * * * *

UNITED STATES PATENT AND TRADEMARK OFFICE
CERTIFICATE OF CORRECTION

PATENT NO.    : 6,529,182 B1
DATED         : March 4, 2003
INVENTOR(S)   : Burton It is certified that error appears in the above-identified patent and that said Letters Patent is hereby corrected as shown below:

Column 1,
Line 64, change "according to the preferred embodiment" to -- according to the prior art --
Line 65, change "an alternative" to -- the preferred --

Column 2,
Line 26, change "an alternative" to -- the preferred --

Signed and Sealed this

Ninth Day of March, 2004

JON W. DUDAS
*Acting Director of the United States Patent and Trademark Office*